3,007,790
PRODUCTION OF HALOGENATED
COMPOUNDS
Edward D. Weil, Niagara Falls, N.Y., assignor to Hooker
Chemical Corporation, Niagara Falls, N.Y., a corporation of New York
No Drawing. Filed Mar. 3, 1958, Ser. No. 718,394
9 Claims. (Cl. 71—2.7)

This invention relates to a process for preparing halogenated compounds. More particularly, the present invention relates to a process for treating hexachlorobutadiene with gaseous molecular oxygen and recovering the halogenated compounds thereby produced.

The compounds prepared by the process of the present invention include: tetrachlorosuccinoyl chloride, dichloromalonyl chloride, dichloromaleyl chloride, pentachloroacetyl chloride (a new composition of matter), trichloroacetyl chloride and dichloromaleic anhydride. Pentachloroacetoacetyl chloride is preferred and can be made as the chief product of the process.

In accordance with the process of the present invention, it has been found that by passing gaseous oxygen through hexachlorobutadiene at an elevated temperature, the above named compounds can be prepared. Since the reaction is dependent in part upon contact with the gaseous oxygen, it is recommended that the oxygen be introduced in such a way as to maintain the oxygen in a highly divided state so as to increase the interfacial area of contact. Generally, the oxygen may be introduced into the reaction mixture by a bubbling technique using a pipe orifice placed below the surface of the liquid. Sintered glass or porous clay may be used and are preferred means to disseminate the oxygen throughout the liquid reaction mixture. Rapid stirring during the reaction is also useful in the dispersion of the gaseous reactant. Other techniques, such as the use of tall towers containing the reaction mixture, may also be used to gain a prolonged interfacial contact between the gas bubbles and the reaction mixture, thus utilizing the oxygen to its greatest advantage. The use of continuous reactors whereby the oxygen is forced countercurrently through a continuously moving stream of the reaction mixture is also advantageous.

It has also been found that catalysts may be employed in the process of the present invention in order to minimize side reactions and increase the reaction rate and degree of completion. Consequently, the use of catalysts are preferred, although they are not necessary. Illustrative but not limitative of catalysts which can be used are ultraviolet light, a small amount of chlorine gas mixed into the oxygen gas, activated charcoal, peroxides and partially oxidized material from a prior oxidation run. For example, by exposing the reaction mixture to actinic radiation, e.g., the light from a mercury vapor lamp, especially during the early stages of the reaction, side reactions can be minimized and the reaction rate and degree of completion can be appreciably increased. In order to overcome the induction period that frequently occurs it is desirable to use well purified hexachlorobutadiene since inhibitory impurities may exist in the unpurified hexachlorobutadiene. Purification can be accomplished by fractionation or chlorination of impurities by use of elemental chlorine or ferric chloride, although a preferred method is prolonged reflux of hexachlorobutadiene with ferric chloride followed by distillation.

In order that those skilled in the art may have sufficiently detailed instructions for practicing the process of this invention, it will be illustrated in the typical examples which follow. This detailed disclosure is not to be construed as limiting the scope of the invention as further indicated elsewhere herein.

*Example 1*

A three-necked, round-bottomed flask was equipped with a thermometer, sparger and stirrer and was connected to a Dry Ice trap through a condenser. One two hundred and fifty watt mercury vapor lamp was positioned so as to illuminate both the liquid and vapor phases. Five hundred milliliters of hexachlorobutadiene were placed in the flask. The hexachlorobutadiene was refluxed and oxygen gas was bubbled through the heated reactant at a rate sufficient to cause reflux at a temperature between about one hundred and forty and one hundred and seventy degrees centigrade. The heating and oxygen was continued for about thirty-six hours during which time the refractive index changed from $n_D^{24}$ 1.5545 to $n_D^{24}$ 1.5060. At the end of the reaction period the crude product was cooled and fractionally distilled under vacuum under a pressure of from thirty-four to sixty-one millimeters of mercury. The products were analyzed and found to include the following: dichloromalonyl chloride, boiling from sixty-eight to seventy-five degrees centigrade is fifty-millimeters of mercury pressure; dichloromaleyl chloride boiling from one hundred and eight degrees centigrade to one hundred and twenty degrees centigrade and at forty-nine to sixty-one millimeters of mercury; and pentachloroacetoacetyl chloride boiling from one hundred and thirty degrees centigrade to one hundred and thirty-three degrees centigrade at fifty to fifty-six millimeters of mercury.

*Example 2*

A three-necked, round bottomed flask was equipped with a thermometer, sparger and stirrer and was connected to a Dry Ice trap through a condenser. Three thousand milliliters of hexachlorobutadiene was placed in the flask. The hexachlorobutadiene was heated and oxygen gas containing one percent chlorine gas intermixed therein was passed through the sparger which extended below the surface of the liquid and bubbled through the heated reactant at a rate sufficient to cause reflux at a temperature between about one hundred and sixty-five and one hundred and eighty degrees centigrade. The heating was continued for approximately two days during which time the refractive index changed from about $n_D^{21}$ 1.5550 to $n_D^{21}$ 1.5281 at the end of the reaction period. The crude product was cooled and fractionally distilled under vacuum under a pressure of from six to fifty-five millimeters of mercury. The liquid products were thoroughly analyzed and found to contain the following: about ten percent trichloroacetyl chloride boiling at twenty-four point five to twenty-seven point five degrees centigrade at six to ten millimeters of mercury; about seven percent dichloromalonyl chloride boiling at twenty-nine point five to thirty-two degrees centigrade at six millimeters of mercury; about one percent crystals of dichloromaleic anhydride; about six percent dichloromaleyl chloride boiling at eighty degrees centigrade at fifty-five millimeters of mercury; about forty-four percent unreacted hexachlorobutadiene which can be recycled in the process; about twenty-five percent pentachloroacetoacetyl chloride boiling at one hundred and thirty-five to one hundred and thirty-eight degrees centigrade at forty-nine to fifty-one millimeters of mercury; about four percent tetrachlorosuccinoyl chloride boiling at one hundred and thirty-seven point five to one hundred and thirty-nine point five degrees centigrade at fifty-two millimeters of mercury; and about three percent of high boiling residues identified as a mixture of acid chlorides.

*Example 3*

The preferred method is to run the reaction with a catalyst but this is not necessary for the process of this invention as evidenced by the following example. A three-necked, round-bottomed flask was equipped with a thermometer, sparger and stirrer and was connected to a Dry Ice trap through a condenser. One hundred milliliters of hexachlorobutadiene was placed in the flask. The hexachlorobutadiene was heated and oxygen gas was passed through the sparger which extended below the surface of the liquid and bubbled through the heated reactant at a rate sufficient to cause reflux at a temperature of about two hundred degrees centigrade. The heating and oxygen was continued for approximately six hours during which time the refractive index changed from $n_D^{21}$ 1.5550 to $n_D^{21}$ 1.5394 at the end of the reaction period. The products obtained and yields thereof are comparable to the foregoing example.

*Example 4*

The esters of pentachloroacetoacetyl chloride are useful as herbicides. The esters are prepared by adding pentachloroacetoacetyl chloride to an excess of the desired alcohol, following by stripping the unreacted alcohol. The following esters were applied at the rate of eight pounds per acre to a field infested with witch grass and seeded with millet and rye grass. After one month the following pre-emergence activity was observed; methyl pentachloroacetoacetate shows strong grass inhibitory action; n-butyl pentachloroacetoacetate showed moderate grass inhibitory action; ethyl hexyl pentachloroacetoacetate showed traces of grass inhibitory action; triethylene glycol pentachloroacetoacetate showed strong grass inhibitory action; and glycol pentachloroacetoacetate showed moderately strong grass inhibitory action. All of the above compounds showed a slight post-emergence activity on millet and soybeans.

The oxygen utilized in the present process is preferably substantially pure gaseous oxygen such as is available commercially in pressurized cylinders, but air containing oxygen diluted with relatively inert gases, may also be utilized. Since the molecular oxygen is the active component in the present process, a greater rate of reaction is obtained by the use of relatively pure oxygen than by the use of the less preferred air which contains oxygen diluted with inert gases, notably nitrogen. However, both are suitable in the present process to produce comparable products.

The temperature of the reaction in the present invention may vary, but generally temperatures from about fifty to about three hundred degrees centigrade are operable, and temperatures from about one hundred and forty to about two hundred and ten degrees centigrade are preferred. The time of reaction may vary and generally it does vary with the temperature and pressure. The reaction may be conveniently run in conventional apparatus and since pressure is not a critical factor, the apparatus may be open to the atmosphere. The process of the present invention can also be run as a continuous process by passing the gaseous oxygen countercurrently through a moving bed of the liquid hexachlorobutadiene. In such a process the acid number of the reaction mixture can be used to follow the course of the reaction. If the reaction is run under atmospheric pressure, then the maximum temperature is limited to about two hundred and ten degrees centigrade due to the boiling point of hexachlorobutadiene. However, the use of superatmospheric pressures up to about two hundred pounds per square inch is advantageous in producing higher yields through better contact of the liquid hexachlorobutadiene and oxygen. It also allows the use of the aforesaid temperatures.

The time of reaction will vary with other factors; such as, temperature at which the reaction is carried out, the area of contact, the contact time, and the rate of oxygen throughout. Generally, it may be stated that satisfactory yields will be obtained in periods of time ranging from several hours to several days.

The rate of oxygen influx will depend upon several factors, among which are the temperature of the reaction, the size of oxygen bubbles, and the length of contact time.

Another factor which may affect the reaction is the purity of the oxygen reactant. For example, while the use of substantially pure gaseous oxygen is preferred, various diluents such as nitrogen may be used. Generally, the rate of oxygen influx should be about one hundred cc. per minute per mole of hexachlorobutadiene, and a preferred rate of oxygen influx is between about eight hundred and twelve hundred cc. per minute per mole. It should be understood that these rates apply to the pure oxygen reactant and where oxygen is used in a dilute form, as by the use of air, the rate of reaction will be accordingly reduced.

While a preferred procedure in the process of the present invention is to react the hexachlorobutadiene with gaseous oxygen in the absence of solvent, thus eliminating the necessity of later separations, the use of solvents is not detrimental to the present process. Such solvents should preferably be inert to gaseous oxygen and to the organic acid chlorides which are produced by this process.

Trichloroacetyl chloride, and pentachloroacetoacetyl chloride are useful as intermediates in the preparation of herbicides. Dichloromalonyl chloride, dichloromaleyl chloride, dichloromaleic anhydride and tetrachlorosuccinoyl chloride are useful as reactants in the production of polyester resins wherein a high percentage of chlorine will impart fire resistance to the polyester product.

The acids may be prepared from the acid chlorides of of the present process by performing the oxidation of hexachlorobutadiene in the presence of a hydrolyzation agent such as dilute alkali or sulfuric acid. The acids may also be prepared by preparing the acid chlorides in accordance with the process of the present invention and hydrolyzing in the presence of a hydrolyzation agent such as dilute caustic or acid.

Pentachloroacetoacetyl chloride has an empirical formula $C_4Cl_6O_2$, and can be represented as follows:

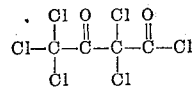

The boiling point is approximately two hundred and twenty-five degrees centigrade at one atmosphere. It is a colorless liquid and has an irritating odor. The refractive index is 1.5136 (twenty-one point five degrees centigrade) and the density one point seventy (twenty-four degrees centigrade). Upon refluxing with methanol, a colorless liquid ester boiling at one hundred and forty-two to one hundred and forty-five degrees centigrade (27 mm.) is obtained, having a total chlorine content of sixty-one point six percent (calcd. for $CCl_3COCCl_2CO_2CH_3$, sixty-one point five percent). It was shown to react with aqueous pyridine to yield $CO_2$ and $CHCl_2COOH$, and by treatment with aqueous $NH_3$ to yield $CCl_3CONH_2$.

In the application shown in Example 4, the esters, for example, methyl pentachloracetoacetate, n-butyl pentachloroacetoacetate, ethyl hexyl pentachloroacetoacetate, triethylene glycol pentachloroacetoacetate, and glycol pentachloroacetoacetate, were applied in aqueous emulsion. They may also be applied as such, or in a solvent such as an aliphatic or aromatic hydrocarbon, or absorbed on a solid carrier, or in an emulsion with water.

The compositions, methods of their preparation and the methods of application to the media to be treated have been given in Example 4 for the purpose of illustration and not limitation. For example, esters of aromatic alcohols may be used rather than the aliphatic alcohols as shown by Example 4. Examples of aromatic alcohols that may be used include phenols, naphthols, etc.

This invention may be embodied in other forms or carried out in other ways without departing from the spirit or essential characteristics thereof. The present embodiment of the invention is therefore, to be considered as in all respects, illustrative and not restrictive, the scope of the invention being indicated by the appended claims and all changes which come within the meaning

I claim:

1. A process for the production of pentachloroacetoacetyl chloride which comprises heating hexachlorobutadiene to a temperature between about fifty degrees centigrade and about three hundred degrees centigrade while passing oxygen therethrough and separating pentachloroacetoacetyl chloride as product of the process.

2. A herbicidal composition comprising as an essential active ingredient an ester of pentachloroacetoacetic acid and a carrier therefor.

3. Process for the production of pentachloroacetoacetyl chloride which comprises heating hexachlorobutadiene to a temperature between about one hundred and forty and about two hundred and ten degrees centigrade in the presence of oxygen and chlorine, and recovering pentachloroacetoacetyl chloride by distillation of the crude reaction product.

4. Process for the product of esters of pentachloroacetoacetic acid which comprises heating hexachlorobutadiene to a temperature between about fifty and about three hundred degrees centigrade while passing oxygen therethrough, isolating the pentachloroacetoacetyl chloride thus formed, and mixing said chloride with an alcohol.

5. Process according to claim 4 wherein the alcohol is an aliphatic alcohol.

6. A herbicidal composition comprising as an essential active ingredient an alkyl pentachloroacetoacetate and a carrier therefor.

7. A herbicidal composition of claim 6 wherein the alkyl group is methyl.

8. A herbicidal composition comprising as an essential active ingredient a glycol ester of pentachloroacetoacetic acid and a carrier therefor.

9. A herbicidal composition of claim 8 wherein the glycol is triethylene glycol.

References Cited in the file of this patent

UNITED STATES PATENTS 2,807,579     Molotsky et al.            Sept. 24, 1957

OTHER REFERENCES

Roedig et al.: Ann. Chem., Justus Liebig's, vol. 600, pp. 1–11 (1956).